(12) United States Patent
Ootsuka et al.

(10) Patent No.: US 12,271,604 B2
(45) Date of Patent: Apr. 8, 2025

(54) RECORDING CONTROL SYSTEM, CONTROL DEVICE, RECORDING CONTROL METHOD, AND STORAGE MEDIUM

(71) Applicant: Panasonic Intellectual Property Management Co., Ltd., Osaka (JP)

(72) Inventors: Takeshi Ootsuka, Hyogo (JP); Hideaki Yamashita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 249 days.

(21) Appl. No.: 17/418,672

(22) PCT Filed: Mar. 4, 2020

(86) PCT No.: PCT/JP2020/009280
§ 371 (c)(1),
(2) Date: Jun. 25, 2021

(87) PCT Pub. No.: WO2020/179851
PCT Pub. Date: Sep. 10, 2020

(65) Prior Publication Data
US 2022/0075535 A1    Mar. 10, 2022

Related U.S. Application Data

(60) Provisional application No. 62/819,150, filed on Mar. 15, 2019, provisional application No. 62/813,883, filed on Mar. 5, 2019.

(51) Int. Cl.
*G06F 21/78* (2013.01)
*G06F 3/06* (2006.01)
*G06F 21/10* (2013.01)
*G06K 7/00* (2006.01)
*G06F 21/44* (2013.01)

(52) U.S. Cl.
CPC .......... *G06F 3/0622* (2013.01); *G06F 3/0659* (2013.01); *G06F 3/0673* (2013.01);
(Continued)

(58) Field of Classification Search
CPC ........ G06F 3/0622; G06F 21/78; G06F 21/10; G06F 21/44; G06F 3/0673
See application file for complete search history.

(56) References Cited

U.S. PATENT DOCUMENTS 7,953,950 B2   5/2011  Fujimoto
8,161,225 B2   4/2012  Maeda et al.
(Continued)

FOREIGN PATENT DOCUMENTS

JP   2003-67685 A   3/2003
JP   2006-178923 A  7/2006
(Continued)

OTHER PUBLICATIONS

International Search Report issued in International Patent Application No. PCT/JP2020/009280, dated Jun. 2, 2020, with English translation.

*Primary Examiner* — Michael Krofcheck
*Assistant Examiner* — Janice M. Girouard
(74) *Attorney, Agent, or Firm* — Rimon P.C.

(57) ABSTRACT

A recording control system includes a storage medium and a control device that is detachably connectable to and controls reading/writing of data to/from the storage medium. The storage medium stores a first authentication code corresponding to at least one first attribute of the storage medium among attributes regarding reading and writing. The control device includes: a readout unit that outputs first request information to the storage medium to read therefrom at least one common authentication code each corresponding to a respective one of at least one common attribute of the (Continued)

first authentication code and the first request information, the first request information corresponding to at least one second attribute of the control device; an identification unit that identifies the at least one common attribute according to the at least one common authentication code; and a control unit that controls the reading/writing according to the at least one common attribute.

13 Claims, 9 Drawing Sheets

(52) U.S. Cl.
CPC .............. *G06F 21/10* (2013.01); *G06F 21/78* (2013.01); *G06K 7/0021* (2013.01); *G06F 21/44* (2013.01)

(56) References Cited

U.S. PATENT DOCUMENTS

| | | |
|---|---|---|
| 8,732,470 B2 | 5/2014 | Nagai et al. |
| 2003/0041187 A1 | 2/2003 | Watanabe |
| 2007/0067598 A1 | 3/2007 | Fujimoto |
| 2014/0032934 A1 | 1/2014 | Nagai et al. |
| 2015/0363335 A1* | 12/2015 | Choi ..................... H04L 9/3278 713/193 |
| 2019/0251297 A1* | 8/2019 | Khan ..................... G06F 21/335 |

FOREIGN PATENT DOCUMENTS

| | | |
|---|---|---|
| JP | 4647492 | 3/2011 |
| JP | 2014-41579 A | 3/2014 |

* cited by examiner

| Authentication code | Attribute (performance) |
|---|---|
| Partial code 310a | Rank A |
| Partial code 310b | Rank B |
| Partial code 310c | Rank C |
| ... | ... |

400

| Password | Attribute (performance) |
|---|---|
| Password 401a, 402a, ... | Rank A |
| Password 401b, 402b, ... | Rank B |
| Password 401c, 402c, ... | Rank C |
| ... | ... |

500

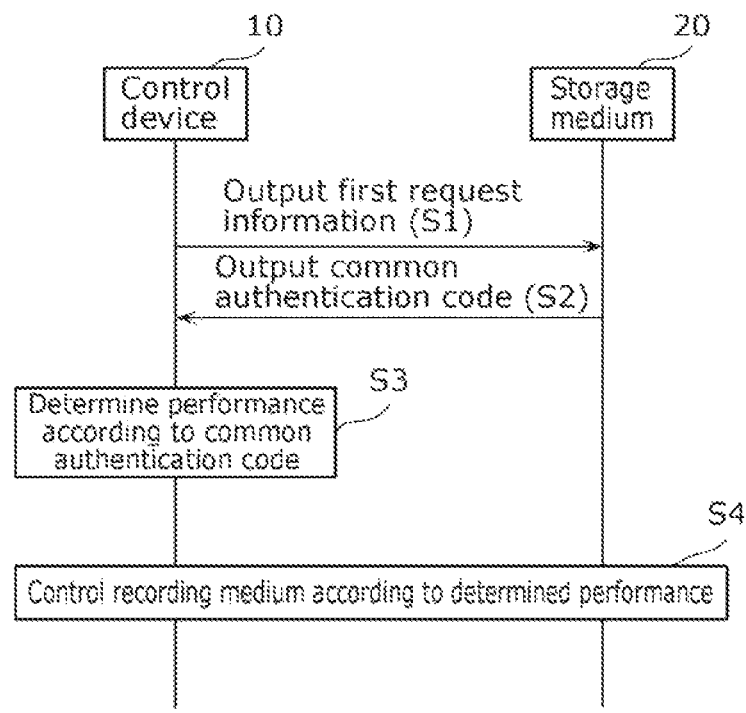
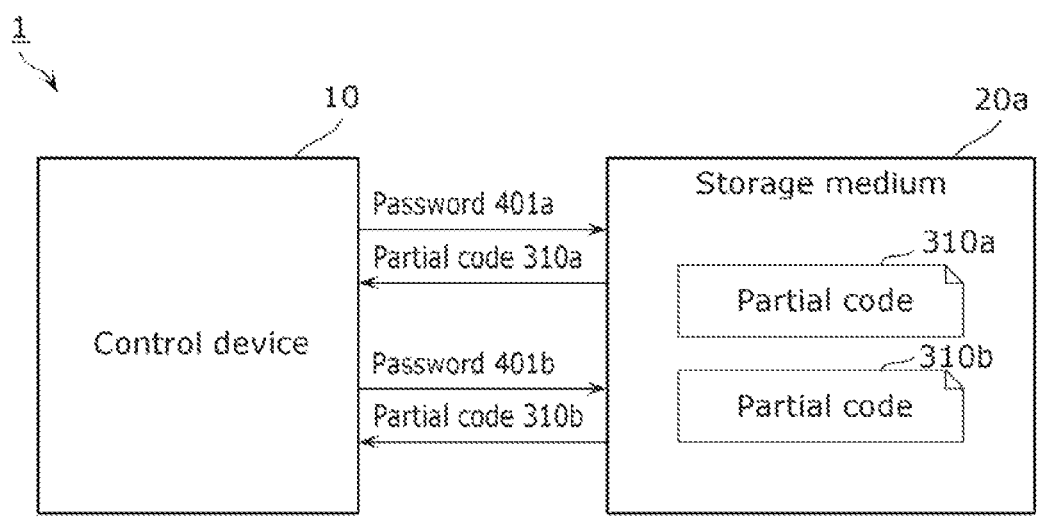

RECORDING CONTROL SYSTEM, CONTROL DEVICE, RECORDING CONTROL METHOD, AND STORAGE MEDIUM

CROSS REFERENCE TO RELATED APPLICATIONS

This patent application is the U.S. National Phase under 35 U.S.C. § 371 of International Application No. PCT/JP2020/009280, filed on Mar. 4, 2020, which claims the benefit of U.S. Patent Application No. 62/819,150, filed on Mar. 15, 2019, and U.S. Patent Application No. 62/813,883, filed on Mar. 5, 2019, the entire contents of each are hereby incorporated by reference in their entirety.

TECHNICAL FIELD

The present disclosure relates to a recording control system, control device, recording control method, and storage medium.

BACKGROUND ART

Patent Literature 1 (PTL 1) discloses a storage device holding performance class information indicating its performance class(es) used for deriving the highest supported performance from performance classes specified according to the performance.

CITATION LIST

Patent Literature

[PTL 1] Japanese Unexamined Patent Application Publication No. 2006-178923

SUMMARY OF INVENTION

Technical Problem

It is desirable to perform, at the highest performance level of guaranteed performance levels, data reading and writing between a storage medium, such as the storage device disclosed in PTL 1, and a control device that controls the reading and writing of data stored in the storage medium.

The present disclosure aims to provide, for example, a recording control system capable of performing data reading and writing between a storage medium and a control device at the highest performance level of guaranteed performance levels.

Solution to Problem

A recording control system according to one aspect of the present disclosure includes a storage medium and a control device to which the storage medium is to be detachably connected and that controls the reading and writing of data from and to the storage medium. The storage medium stores a first authentication code corresponding to at least one first attribute of the storage medium among attributes regarding reading and writing of storage media in general. The control device includes a readout unit, an identification unit, and a control unit. The readout unit outputs first request information to the storage medium connected to the control device to read, from the storage medium, at least one common authentication code each corresponding to a respective one of at least one common attribute of the first authentication code and the first request information, the first request information corresponding to at least one second attribute of the control device regarding the reading and writing performed by the control device among the attributes. The identification unit identifies the at least one common attribute according to the at least one common authentication code read by the readout unit. The control unit controls the reading and writing according to the at least one common attribute identified by the identification unit.

A control device according to another aspect of the present disclosure is a control device to which a storage medium is to be detachably connected and that controls the reading and writing of data from and to the storage medium. The control device includes a readout unit, an identification unit, and a control unit. The readout unit outputs first request information to the storage medium connected to the control device and storing a first authentication code to read, from the storage medium, at least one common authentication code each corresponding to a respective one of at least one common attribute of the first authentication code and the first request information, the first authentication code corresponding to at least one first attribute of the storage medium among attributes regarding reading and writing of storage media in general, and the first request information corresponding to at least one second attribute of the control device regarding the reading and writing performed by the control device among the attributes. The identification unit identifies the at least one common attribute according to the at least one common authentication code read by the readout unit. The control unit that controls the reading and writing according to the at least one common attribute identified by the identification unit.

A recording control method according to still another aspect of the present disclosure is a recording control method implemented by a recording control system. The recording control system includes a storage medium and a control device to which the storage medium is to be detachably connected and that controls the reading and writing of data from and to the storage medium. The storage medium stores a first authentication code corresponding to at least one first attribute of the storage medium among attributes regarding reading and writing of storage media in general. The recording control method includes: outputting first request information to the storage medium connected to the control device to read, from the storage medium, at least one common authentication code each corresponding to a respective one of at least one common attribute of the first authentication code and the first request information, the first request information corresponding to at least one second attribute of the control device regarding the reading and writing performed by the control device among the attributes; identifying the at least one common attribute according to the at least one common authentication code; and controlling the reading and writing according to the at least one common attribute.

A storage medium according to still another aspect of the present disclosure is a storage medium to be detachably connected to a control device that controls the reading and writing of data from and to the storage medium. The storage medium stores a first authentication code corresponding to at least one first attribute of the storage medium among attributes regarding reading and writing. The storage medium outputs, to the control device, at least one authentication code each corresponding to a respective one of at least one common attribute of the first authentication code and first request information that has been output by the control device and that corresponds to at least one second attribute of the control device regarding the reading and writing performed by the control device among the attributes.

Advantageous Effects of Invention

The recording control system according to the present disclosure can perform data reading and writing between the storage medium and the control device at guaranteed performance.

BRIEF DESCRIPTION OF DRAWINGS

FIG. 8 is a sequence diagram illustrating an example of operation of the recording control system.

FIG. 9 illustrates a first example of the operation of the recording control system.

DESCRIPTION OF EMBODIMENTS

Figure 1:
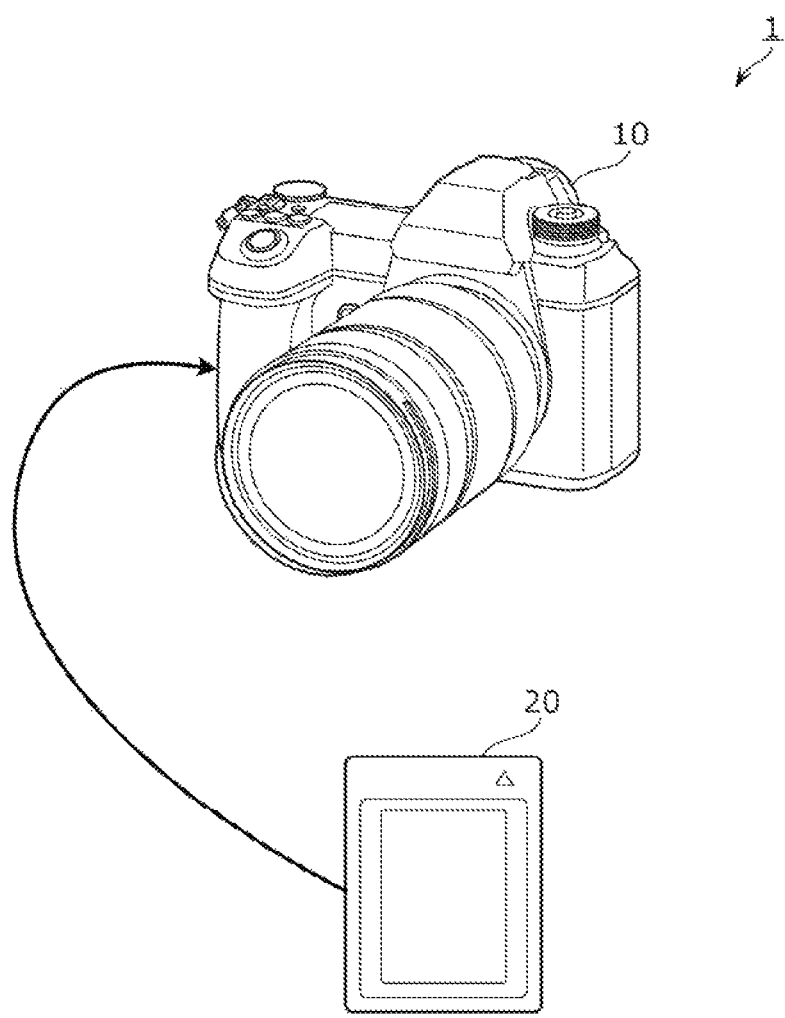
FIG. 1 illustrates an example of a recording control system.

A recording control system according to one aspect of the present disclosure includes a storage medium and a control device to which the storage medium is to be detachably connected and that controls the reading and writing of data from and to the storage medium. The storage medium stores a first authentication code corresponding to at least one first attribute of the storage medium among attributes regarding reading and writing of storage media in general. The control device includes a readout unit, an identification unit, and a control unit. The readout unit outputs first request information to the storage medium connected to the control device to read, from the storage medium, at least one common authentication code each corresponding to a respective one of at least one common attribute of the first authentication code and the first request information, the first request information corresponding to at least one second attribute of the control device regarding the reading and writing performed by the control device among the attributes. The identification unit identifies the at least one common attribute according to the at least one common authentication code read by the readout unit. The control unit controls the reading and writing according to the at least one common attribute identified by the identification unit.

Thus, by outputting the first request information to the storage medium, the control device reads the at least one common authentication code each corresponding to a respective one of the at least one common attribute of the first authentication code and the first request information. The control device then identifies the at least one common attribute according to the at least one common authentication code. Hence, the control device can read and write data from and to the storage medium at performance guaranteed by both the control device and the storage medium.

If for instance the first authentication code and the first request information are information issued by a predetermined certification authority according to certification results for the storage medium and the control device, the control device can control the reading and writing of data from and to the storage medium in an operation mode in which operation is guaranteed by both the control device and the storage medium.

If the readout unit fails to read the at least one common authentication code, the control unit need not perform the reading and writing on the storage medium.

Thus, if the data reading and writing operation is not guaranteed by both the control device and the storage medium, it is possible to suppress the not guaranteed operation from being performed.

The first authentication code may include at least one partial code and an additional code, the at least one partial code each corresponding to a respective one of the at least one first attribute, and the additional code indicating certification-relevant information relevant to certification of the at least one first attribute corresponding to the at least one partial code by a certification authority.

Thus, by reading and analyzing the additional code, the control device can verify whether the storage medium connected to the control device is a storage medium certified by the certification authority.

The storage medium may further store a second authentication code showing the legitimacy of the first authentication code. The readout unit may read the second authentication code from the storage medium by outputting second request information different from the first request information to the storage medium.

Thus, by reading and analyzing the second authentication code, the control device can verify the legitimacy of the first authentication code stored in the storage medium connected to the control device.

The second authentication code may be encrypted using the second request information as an encryption key.

Thus, it is possible to limit a control device capable of verifying the legitimacy of the first authentication code to a particular control device capable of decoding the second authentication code.

By referring to a list in which the attributes are associated with authentication codes corresponding to the respective attributes, the identification unit may identify, as the at least one common attribute, at least one attribute associated with the at least one common authentication code in the list.

Thus, it is possible to identify the at least one common attribute of the control device and the storage medium according to the obtained at least one common authentication code.

The attributes may include at least one of the specification versions or performance ranks of storage media in general.

A control device according to another aspect of the present disclosure is a control device to which a storage medium is to be detachably connected and that controls the reading and writing of data from and to the storage medium. The control device includes a readout unit, an identification unit, and a control unit. The readout unit outputs first request information to the storage medium connected to the control device and storing a first authentication code to read, from the storage medium, at least one common authentication code each corresponding to a respective one of at least one common attribute of the first authentication code and the first request information, the first authentication code corresponding to at least one first attribute of the storage medium among attributes regarding reading and writing of storage media in general, and the first request information corresponding to at least one second attribute of the control device regarding the reading and writing performed by the control device among the attributes. The identification unit identifies the at least one common attribute according to the at least one common authentication code read by the readout unit. The control unit that controls the reading and writing according to the at least one common attribute identified by the identification unit.

Thus, by outputting the first request information to the storage medium, the control device reads the at least one common authentication code each corresponding to a respective one of the at least one common attribute of the first authentication code and the first request information. The control device then identifies the at least one common attribute according to the at least one common authentication code. Hence, the control device can read and write data from and to the storage medium at performance guaranteed by both the control device and the storage medium.

A recording control method according to still another aspect of the present disclosure is a recording control method implemented by a recording control system. The recording control system includes a storage medium and a control device to which the storage medium is to be detachably connected and that controls the reading and writing of data from and to the storage medium. The storage medium stores a first authentication code corresponding to at least one first attribute of the storage medium among attributes regarding reading and writing of storage media in general. The recording control method includes: outputting first request information to the storage medium connected to the control device to read, from the storage medium, at least one common authentication code each corresponding to a respective one of at least one common attribute of the first authentication code and the first request information, the first request information corresponding to at least one second attribute of the control device regarding the reading and writing performed by the control device among the attributes; identifying the at least one common attribute according to the at least one common authentication code; and controlling the reading and writing according to the at least one common attribute.

Thus, by outputting the first request information to the storage medium, the control device reads the at least one common authentication code each corresponding to a respective one of the at least one common attribute of the first authentication code and the first request information. The control device then identifies the at least one common attribute according to the at least one common authentication code. Hence, the control device can read and write data from and to the storage medium at performance guaranteed by both the control device and the storage medium.

A storage medium according to still another aspect of the present disclosure is a storage medium to be detachably connected to a control device that controls the reading and writing of data from and to the storage medium. The storage medium stores a first authentication code corresponding to at least one first attribute of the storage medium among attributes regarding reading and writing. The storage medium outputs, to the control device, at least one authentication code each corresponding to a respective one of at least one common attribute of the first authentication code and first request information that has been output by the control device and that corresponds to at least one second attribute of the control device regarding the reading and writing performed by the control device among the attributes.

Thus, according to the first request information output by the control device, the storage medium outputs the at least one common authentication code each corresponding to a respective one of the at least one common attribute of the first authentication code stored in the storage medium and the first request information. Hence, the control device can identify the at least one common attribute according to the at least one common authentication code and read and write data from and to the storage medium at performance guaranteed by both the control device and the storage medium.

Hereinafter, the recording control system according to an aspect of the present disclosure is described in detail with reference to the drawings.

It should be noted that the embodiment below shows a specific example of the present disclosure. The numerical values, shapes, materials, structural elements, arrangements and connections of the structural elements, steps, orders of steps, and others described in the embodiment below are mere examples and are not intended to limit the present disclosure. Among the structural elements described in the embodiment below, the structural elements not recited in the independent claims, which represent superordinate concepts, are described as optional structural elements.

Embodiment

A configuration of a recording control system according to an embodiment is described.

FIG. 1 illustrates an example of a recording control system according to an embodiment.

As illustrated in FIG. 1, recording control system 1 includes control device 10 and storage medium 20. Control device 10 is equipment to which storage medium 20 is to be detachably connected. Control device 10 controls the reading and writing of data from and to storage medium 20 connected to control device 10. Control device 10 is, for example, a digital still camera. It should be noted that control device 10 is not limited to a digital still camera and may be a digital video camera, a memory card reader/writer, or other equipment. Control device 10 is also referred to as a host.

Storage medium 20 includes a connector electrically connectable to control device 10. Control device 10 electrically connected to the connector reads data from storage medium 20 and writes new data to storage medium 20. Storage medium 20 is, for example, a semiconductor memory card, such as a CFEXPRESS (registered trademark) card or an SD memory card. Storage medium 20 is not limited to such a semiconductor memory card and may be other storage medium, such as universal serial bus (USB) memory or an optical disk.

Figure 2:
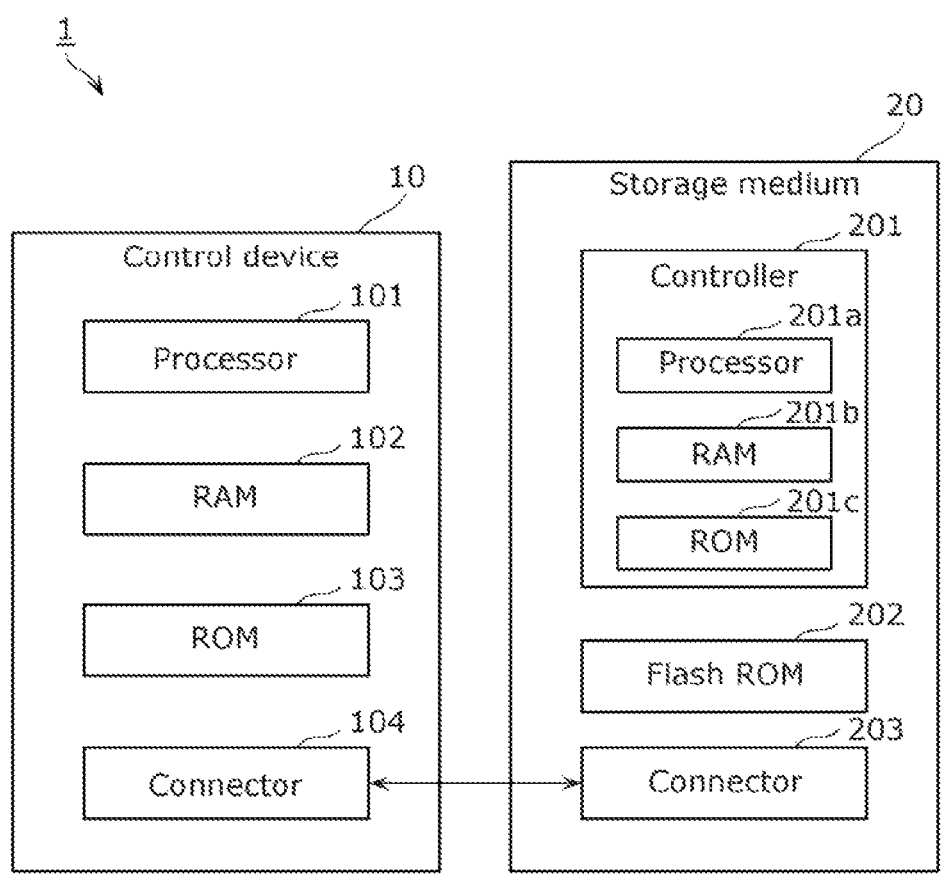
FIG. 2 is a block diagram illustrating an example of the hardware configuration of the recording control system.

FIG. 2 is a block diagram illustrating an example of the hardware configuration of the recording control system.

Control device 10 includes processor 101, random access memory (RAM) 102, read only memory (ROM) 103, and connector 104.

Processor 101 runs a control program stored in, for example, ROM 103.

RAM 102 is a volatile storage area used as a work area when processor 101 runs the control program.

ROM 103 is a nonvolatile storage area that holds, for example, the control program. ROM 103 may be a nonvolatile storage area in which data writing, erasing, rewriting, and reading can be performed.

Connector 104 is an interface connectable to connector 203 of storage medium 20 and used for transmitting and receiving data to and from storage medium 20. Connector 104 may be any interface capable of, for example, transmitting and receiving data to and from a semiconductor memory card.

Storage medium 20 includes controller 201, flash read only memory (ROM) 202, and connector 203.

Controller 201 controls the reading and writing of data from and to flash ROM 202. Controller 201 transmits and receives data to and from control device 10 via connector 104 of control device 10. According to data or request information (command) received from control device 10, controller 201 performs one of data writing, erasing, rewriting, and reading on flash ROM 202. Specifically, controller 201 includes processor 201a, RAM 201b, and ROM 201c.

Processor 201a runs a control program stored in, for example, ROM 201c.

RAM 201b is a volatile storage area used as a work area when processor 201a runs the control program.

ROM 201c is a nonvolatile storage area that holds, for example, the control program.

Flash ROM 202 is a nonvolatile storage area in which data writing, erasing, rewriting, and reading can be performed.

Connector 203 is an interface connectable to connector 104 of control device 10 and used for transmitting and receiving data to and from control device 10. Connector 203 may be any interface capable of transmitting and receiving data to and from control device 10.

Figure 3:
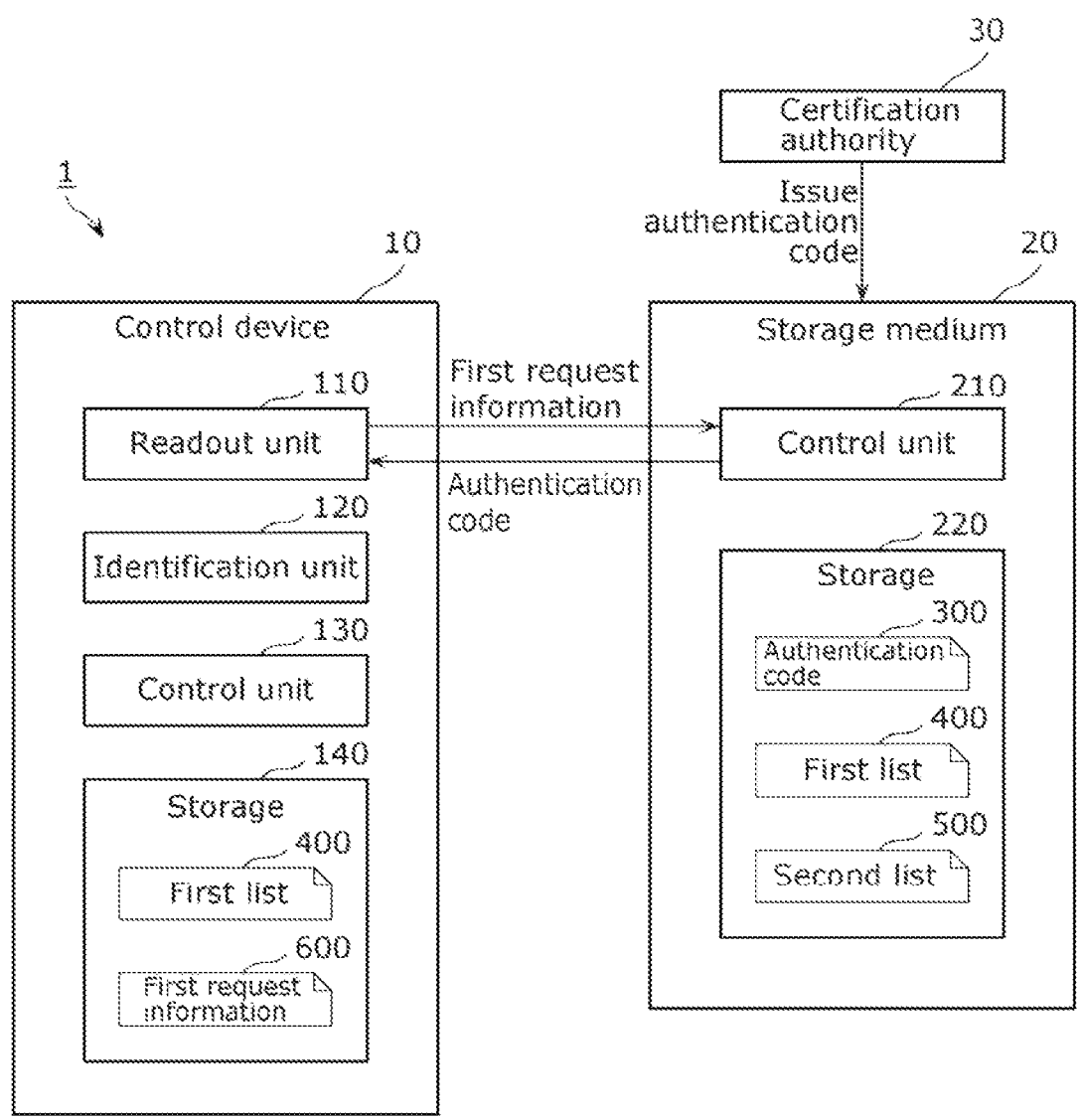
FIG. 3 is a block diagram illustrating an example of the functional configuration of the recording control system.
Figures 4, 5, 6:
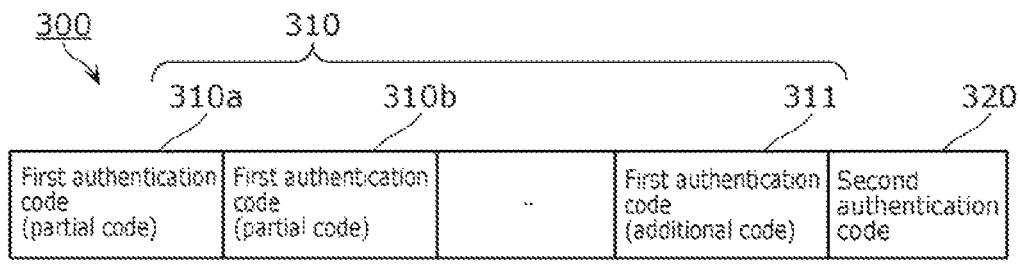
FIG. 4 illustrates a configuration example of authentication codes.
FIG. 5 illustrates an example of a first list.
FIG. 6 illustrates an example of a second list.

FIG. 3 is a block diagram illustrating an example of the functional configuration of the recording control system. FIG. 4 illustrates a configuration example of authentication codes.

FIG. 3 illustrates certification authority 30 as well as control device 10 and storage medium 20 of recording control system 1. Certification authority 30 certifies that control device 10 has at least one attribute and that storage medium 20 has at least one attribute. Certification authority 30 then generates authentication codes based on a certification result for storage medium 20. The generated authentication codes are issued to storage medium 20 certified by certification authority 30. For instance, when storage medium 20 is manufactured, the authentication codes are stored in flash ROM 202 or a nonvolatile storage area (not illustrated) of controller 201. In addition, certification authority 30 generates request information based on a certification result for control device 10 and issues generated first request information 600 and second request information to the vendor of control device 10. When manufacturing control device 10, the vendor gives first request information 600 to control device 10. For instance, ROM 103 of control device 10 stores first request information 600. The second request information differs from first request information 600. The second request information is not issued to control device 10 and is instead managed by the vendor and certification authority 30. Certification authority 30 is also referred to as a management organization. Details of first request information 600 and the second request information are described later.

First, a functional configuration of storage medium 20 is described.

As its functional elements, storage medium 20 includes control unit 210 and storage 220.

Control unit 210 receives first request information 600 from control device 10. Control unit 210 then selects, from partial codes 310a and 310b and the rest of first authentication code 310, at least one common authentication code each corresponding to a respective one of at least one common attribute of first authentication code 310 and first request information 600, first authentication code 310 being included in authentication code 300 stored in storage 220. Subsequently, control unit 210 outputs the selected at least one common authentication code to control device 10. A specific example of the processing of selecting a common authentication code is described later. Control unit 210 is, for example, controller 201.

Storage 220 stores authentication code 300. As illustrated in FIG. 4, authentication code 300 includes first authentication code 310 and second authentication code 320. First authentication code 310 includes additional code 311 and at least one partial code: partial codes 310a and 310b and the rest in the figure. First authentication code 310 may include one partial code or at least two partial codes. It should be noted that first authentication code 310 is identical to authentication code 1 and is also referred to as AT_Code1. Second authentication code 320 is identical to authentication code 2 and is also referred to as AT_Code2. Storage 220 is, for example, ROM 201c of controller 201 or flash ROM 202.

Storage 220 stores first list 400 and second list 500.

Storage medium 20 has at least one first attribute, and partial codes 310a and 310b and the rest indicate the respective first attributes of storage medium 20 among the attributes of storage media in general. Partial codes 310a and 310b and the rest are also referred to as the features of AT_Code1. The at least one first attribute represents at least one attribute of storage medium 20 among the attributes of storage media in general. Each of partial codes 310a and 310b and the rest corresponds to a different one of attributes. Specifically, an attribute is an attribute of a storage medium regarding reading and writing, and the attributes include at least one of the performance ranks and the specification versions of storage media in general. The performance rank of a storage medium is specified according to, for example, the data reading speed and/or data writing speed. The attribute of the storage medium regarding the reading and writing may be a data recording format. The attribute may be a function of the storage medium regarding the reading and writing. The attributes of storage media in general are different attributes that can be specified in storage media in general.

For instance, in storage media in general, performance ranks are categorized into ranks A, B, C, and D. As an example, consider a case in which the performance of storage medium 20 belongs to ranks A and B. The attributes of storage media in general correspond to ranks A, B, C, and D. The at least one first attribute corresponds to the performance of storage medium 20, that is, ranks A and B. In this case, storage medium 20 stores, for instance, partial code 310a corresponding to rank A and partial code 310b corresponding to rank B. The partial codes included in authentication code 300 stored in storage medium 20 show that storage medium 20 belongs to the ranks corresponding to the partial codes.

Additional code 311 indicates certification-relevant information relevant to the fact that certification authority 30 has certified that storage medium 20 has at least one first attribute each corresponding to a respective one of at least one partial code, that is, storage medium 20 has first attributes corresponding to partial codes 310a and 310b and the rest. Additional code 311 is information indicating, for example, the date of certification of the at least one first attribute of storage medium 20 by certification authority 30 and vendor information identifying the vendor of storage medium 20. Additional code 311 is also referred to as meta data or the meta-data of AT_Code1.

Second authentication code 320 shows the legitimacy of first authentication code 310. Second authentication code 320 may be a code encrypted using the second request information as an encryption key. The second request information is, for example, a given character string associated with storage medium 20. As the vendor of control device 10 and certification authority 30 manage the second request information, only the vendor of storage medium 20 and certification authority 30 can decode second authentication code 320 stored in storage medium 20. If for instance the vendor of control device 10 or certification authority 30 manages control device 10, readout unit 110 of control device 10 outputs the second request information to storage medium 20 to read second authentication code 320 from storage medium 20. In this case, the second request information is, for example, a given character string identified according to a user input received by the input receiving unit (not illustrated) of control device 10. That is, control device 10 identifies the second request information according to the user input and then outputs the identified second request information to storage medium 20. In this way, control device 10 reads second authentication code 320 from storage medium 20. That is, control device 10 does not hold the second request information in advance.

It should be noted that if readout unit 110 cannot read second authentication code 320, control device 10 cannot verify the legitimacy of first authentication code 310. In this case, control device 10 may cause a display (not illustrated) to display a message indicating that the legitimacy of first authentication code 310 cannot be verified. The display may be an external display or an external portable terminal.

It should be noted that first authentication code 310 includes at least one partial code each corresponding to a respective one of at least one first attribute, the at least one partial code being partial codes 310a and 310b and the rest in the example. In other words, first authentication code 310 corresponds to the at least one first attribute.

As illustrated in FIG. 5, first list 400 is information showing relationships between attributes and partial codes (authentication codes) corresponding to the respective attributes. As illustrated in first list 400 in FIG. 5, for instance, partial code 310a corresponds to rank A, partial code 310b corresponds to rank B, and partial code 310c corresponds to rank C. Certification authority 30 issues first list 400, and when storage medium 20 is manufactured, first list 400 is stored in storage 220.

As illustrated in FIG. 6, second list 500 is information showing relationships between each attribute and different passwords corresponding to the attribute. As illustrated in second list 500 in FIG. 6, passwords 401a and 402a and the rest correspond to rank A, passwords 401b and 402b and the rest correspond to rank B, and passwords 401c and 402c and the rest correspond to rank C. Certification authority 30 issues second list 500, and when storage medium 20 is manufactured, second list 500 is stored in storage 220.

Hereinafter, the processing of control unit 210 selecting a common authentication code is described in detail. When receiving first request information 600 from control device 10, control unit 210 refers to second list 500 stored in storage 220. In second list 500, control unit 210 identifies, as the attribute (second attribute) of control device 10, an attribute associated with a password included in received first request information 600. It should be noted that if first request information 600 includes more than one password, control unit 210 identifies attributes associated with the respective passwords. That is, in this case, control unit 210 identifies the attributes as the second attributes of control device 10. For instance, control unit 210 determines that the second attributes are ranks A and B.

Control unit 210 refers to first list 400. As at least one common authentication code, control unit 210 selects, from partial codes 310a and 310b and the rest of first authentication code 310, at least one partial code associated with at least one common attribute of at least one first attribute and the identified at least one second attribute. For instance, when determining that the second attributes are ranks A and B, control unit 210 selects, as common authentication codes, partial code 310a corresponding to rank A and partial code 310b corresponding to rank B in first list 400.

It should be noted that instead of storing first list 400 and second list 500 as described above, storage 220 may store a list in which authentication codes are associated with passwords according to the matching rank. That is, storage 220 may store a list in which authentication codes are associated with passwords. Even in this case, by using a password included in first request information 600 received from control device 10, control unit 210 can select, as a common authentication code, a partial code associated with the password in the list.

Next, a functional configuration of control device 10 is described.

As its functional elements, control device 10 includes readout unit 110, identification unit 120, control unit 130, and storage 140.

Readout unit 110 outputs, to storage medium 20 connected to control device 10, first request information 600 corresponding to at least one second attribute among the attributes. The at least one second attribute is at least one attribute of control device 10 among the attributes. By outputting first request information 600 to storage medium 20, readout unit 110 can notify storage medium 20 of the at least one second attribute of control device 10. This enables readout unit 110 to read, from the storage medium, at least one common authentication code each corresponding to a respective one of at least one common attribute of the first authentication code and first request information 600. That is, by outputting first request information 600, readout unit 110 can read the at least one common authentication code used for identifying the at least one common attribute of control device 10 and storage medium 20. It should be noted that readout unit 110 includes, for example, processor 101, RAM 102, ROM 103, and connector 104.

Figure 7:
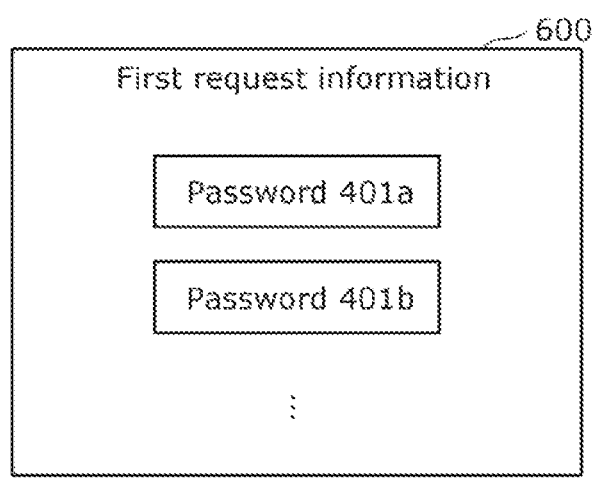
FIG. 7 illustrates a configuration example of first request information.

Here, first request information 600 includes a password used for control device 10 to read a common authentication code identifying a common attribute from storage medium 20 connected to control device 10. Specifically, first request information 600 includes at least one password each corresponding to a respective one of at least one second attribute. Each password corresponds to the respective attribute of control device 10 regarding reading and writing that control device 10 performs on storage media. If for instance control device 10 belongs to ranks A and B, as illustrated in FIG. 7, first request information 600 includes password 401a corresponding to rank A and password 401b corresponding to rank B. Thus, first request information 600 includes at least one password each corresponding to a respective one of the at least one second attribute of control device 10. That is, first request information 600 includes passwords for the respective attributes of control device 10. By outputting first request information 600, readout unit 110 outputs at least one password to storage medium 20, which enables readout unit 110 to read at least one partial code corresponding to at least one attribute known from the at least one password.

Identification unit 120 identifies the at least one common attribute according to the at least one common authentication code read by readout unit 110. Identification unit 120 refers to first list 400 in FIG. 5 and identifies, as the at least one common attribute of control device 10 and storage medium 20, at least one attribute associated with the at least one common authentication code in first list 400. Identification unit 120 may be a converter that converts the at least one common authentication code read by readout unit 110 into the at least one common attribute. Storage 140 stores first list 400. It should be noted that the at least one common authentication code is at least one partial code corresponding to at least one attribute matching the at least one second attribute corresponding to first request information 600, among partial codes 310a and 310b and the rest. It should be noted that identification unit 120 includes, for example, processor 101, RAM 102, and ROM 103.

Control unit 130 controls the reading and writing according to the at least one common attribute of control device 10 and storage medium 20, identified by identification unit 120. Specifically, control unit 130 controls the reading and writing at the highest performance derived from the at least one common attribute. Thus, control device 10 can control the reading and writing of data from and to storage medium 20 at the highest performance of operation modes in which operation is guaranteed by both control device 10 and storage medium 20.

In addition, if readout unit 110 fails to read a common authentication code, control unit 130 need not perform the reading and writing from and to storage medium 20. Thus, if data reading and writing operation is not guaranteed by both control device 10 and storage medium 20, it is possible to suppress the not guaranteed operation from being performed.

It should be noted that control unit 130 includes, for example, processor 101, RAM 102, ROM 103, and connector 104.

Storage 140 stores first list 400 and first request information 600. Storage 140 is, for example, ROM 103. It should be noted that first list 400 stored in storage 140 is a list issued by certification authority 30, and when control device 10 is manufactured, first list 400 is stored in storage 140.

It should be noted that if one of password 401a and 401b included in first request information 600 stored in storage 140 of control device 10 is known (leaked) to a third party except the vendor of control device 10, the vendor of storage medium 20, and certification authority 30, the password known to the third party, which is one of the passwords included in first request information 600 stored in storage 140, may be updated to another password associated with the attribute (rank) associated with the known password. If for instance password 401a included in first request information 600 is known to a third party, password 401a may be updated to password 402a, which is another password associated with rank A, the rank associated with password 401a, in second list 500 stored in storage 220 of storage medium 20. In this manner, first request information 600 is updated to first request information including passwords 402a and 401b, for instance. If password 401a is updated to another password 402a, control device 10 may output information indicating the prohibition of the use of password 401a to storage medium 20.

When receiving the information indicating the prohibition of the use of password 401a from control device 10, control unit 210 of storage medium 20 performs processing to prohibit storage medium from outputting, to control device 10, partial code 310a corresponding to rank A associated with password 401a even if control unit 210 receives password 401a.

In a first example of the processing performed for prohibition, control unit 210 updates identification information stored in storage 220 from first information to second information. Here, the first information indicates an instruction to output partial code 310a to control device 10 when password 401a is received, and the second information indicates that outputting partial code 310a to control device 10 is prohibited. The identification information is, for example, a flag. The first information corresponds to, for example, 0, and the second information corresponds to, for example, 1. In this case, when receiving password 401a, control unit 210 determines whether identification information for received password 401a indicates the first or second information. If the identification information for received password 401a is the first information, control unit 210 outputs partial code 310a to control device 10. If the identification information is the second information, control unit 210 does not output partial code 310a to control device 10. Thus, if the identification information indicates the prohibition of the use of password 401a, it is possible to prohibit storage medium 20 from outputting partial code 310a corresponding to password 401a to control device 10.

In a second example of the processing performed for prohibition, control unit 210 removes password 401a from second list 500 stored in storage 220. Thus, even if storage medium 20 receives password 401a that has been removed from second list 500, since second list 500 no longer includes password 401a, it is possible to prohibit storage medium 20 from outputting partial code 310a corresponding to password 401a to control device 10.

As described above, if a password is known to a third party, the known password included in first request information 600 of control device 10 is updated to another password associated with the attribute associated with the known password. When the password is updated, control device 10 outputs, to storage medium 20, information indicating the prohibition of the use of the known password. Storage medium 20 then performs the processing to prohibit the use of the known password.

Even if a password is known to a third party, in storage medium 20, more than one password is associated with each attribute. Thus, by updating the password included in first request information 600 of control device 10 and performing the processing to prohibit the use of the known password included in second list 500 stored in storage medium 20, it is possible to prohibit the use of the known password and readily perform authentication processing using another password. This makes it possible to limit a device to which storage medium 20 outputs a partial code to certified control device 10, which facilitates control of the reading and writing of data from and to storage medium 20 in a guaranteed operation mode.

Hereinafter, operation of recording control system 1 is described with reference to FIG. 8. FIG. 8 is a sequence diagram illustrating an example of operation of the recording control system, that is, a recording control method.

Control device 10 outputs first request information 600 to storage medium 20 (S1).

Storage medium 20 then outputs, to control device 10, at least one common authentication code each corresponding to a respective one of at least one common attribute of the first authentication code and first request information 600 (S2).

According to the at least one common authentication code read from storage medium 20, control device 10 determines the common performance of control device 10 and storage medium 20 (S3).

According to the determined common performance, control device 10 controls the reading and writing of data from and to storage medium 20 (S4).

A specific example of the operation of the recording control system is described.

FIG. 9 illustrates a first example of the operation of the recording control system.

In the first example, control device 10 belongs to ranks A and B, and storage medium 20a belongs to ranks A and B. It should be noted that rank B is higher than rank A in terms of performance.

Control device 10 outputs, to storage medium 20a, first request information 600 including passwords 401a and 401b.

As common authentication codes, storage medium 20a outputs, to control device 10, partial code 310a corresponding to rank A associated with password 401a and partial code 310b corresponding to rank B associated with password 401b.

This enables control device 10 to recognize that ranks A and B are the common ranks of control device 10 and storage medium 20a. Thus, control device 10 controls the reading and writing of data from and to storage medium 20a at rank B at which higher performance is possible.

Figure 10:
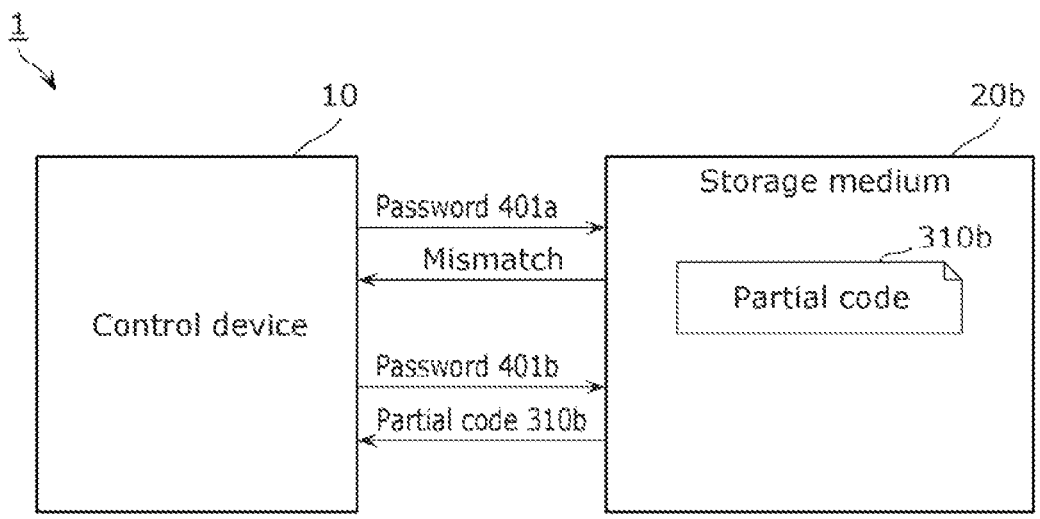
FIG. 10 illustrates a second example of the operation of the recording control system.

FIG. 10 illustrates a second example of the operation of recording control system.

In the second example, control device 10 belongs to ranks A and B, and storage medium 20b belongs to rank B.

Control device 10 outputs, to storage medium 20b, first request information 600 including passwords 401a and 401b.

Not having partial code 310a corresponding to rank A associated with password 401a, storage medium 20 outputs information indicating mismatch to control device 10. In addition, as a common authentication code, storage medium 20b outputs, to control device 10, partial code 310b corresponding to rank B associated with password 401b. It should be noted that if storage medium 20b does not have a corresponding-rank partial code, storage medium 20b need not output information indicating mismatch to control device 10.

This enables control device 10 to recognize that rank B is the common rank of control device 10 and storage medium 20b. Thus, control device 10 controls the reading and writing of data from and to storage medium 20b at rank B.

Figure 11:
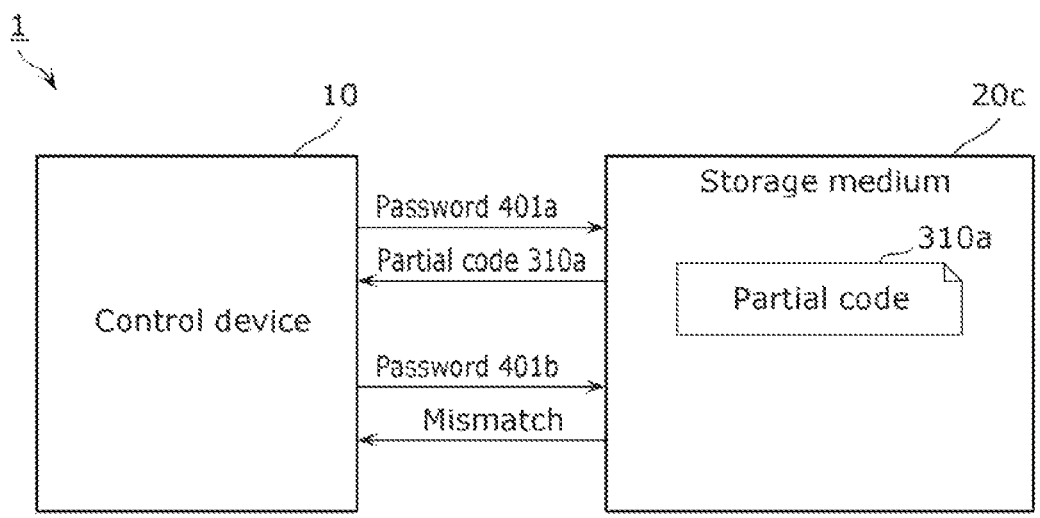
FIG. 11 illustrates a third example of the operation of the recording control system.

FIG. 11 illustrates a third example of the operation of the recording control system.

In the third example, control device 10 belongs to ranks A and B, and storage medium 20c belongs to rank A.

Control device 10 outputs, to storage medium 20c, first request information 600 including passwords 401a and 401b.

As a common authentication code, storage medium 20c outputs, to control device 10, partial code 310a corresponding to rank A associated with password 401a. Not having partial code 310b corresponding to rank B associated with password 401b, storage medium 20c outputs information indicating mismatch to control device 10. It should be noted that if storage medium 20c does not have a corresponding-rank partial code, storage medium 20c need not output information indicating mismatch to control device 10.

This enables control device 10 to recognize that rank A is the common rank of control device 10 and storage medium 20c. Thus, control device 10 controls the reading and writing of data from and to storage medium 20c at rank A.

Figure 12:
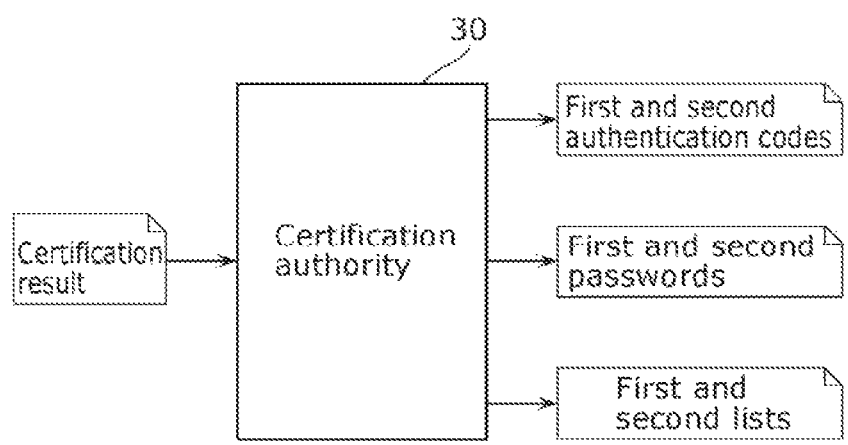
FIG. 12 illustrates an example of data that a certification authority issues to a storage medium.

FIG. 12 illustrates an example of data that the certification authority issues to the storage medium.

When certification authority 30 certifies storage medium 20 (that is, storage medium 20 passes a certification test conducted by certification authority 30), certification authority 30 generates a first authentication code corresponding to at least one attribute of storage medium 20, second authentication code, first password, and second password. The first authentication code corresponds to the first password, and the second authentication code corresponds to the second password. The generated first and second authentication codes are stored in storage medium 20. It should be noted that certification authority 30 may generate a first list and second list at that time. The generated first and second lists are stored in storage medium 20.

Figure 13:
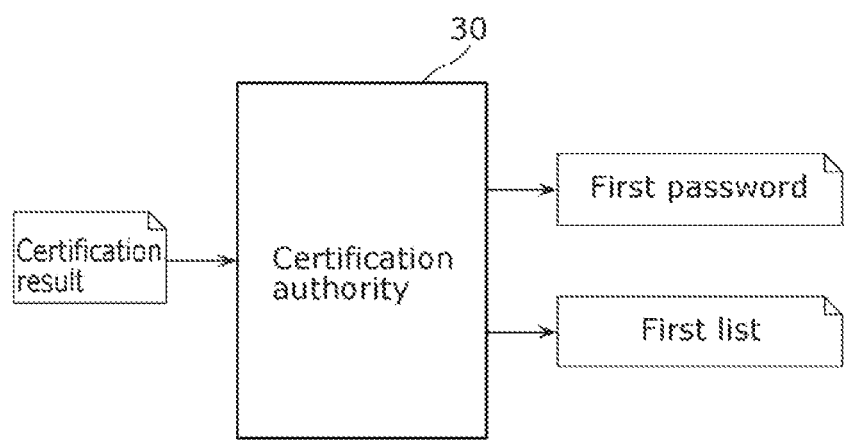
FIG. 13 illustrates an example of data that the certification authority issues to a control device.

FIG. 13 illustrates an example of data that the certification authority issues to the control device.

When certification authority 30 certifies control device 10 (that is, control device 10 passes a certification test conducted by certification authority 30), certification authority 30 generates a first password corresponding to at least one attribute of control device 10 and the first list in which partial codes included in the first authentication code are associated with attributes. The first password and first list are stored in ROM 103 of control device 10.

Figure 14:
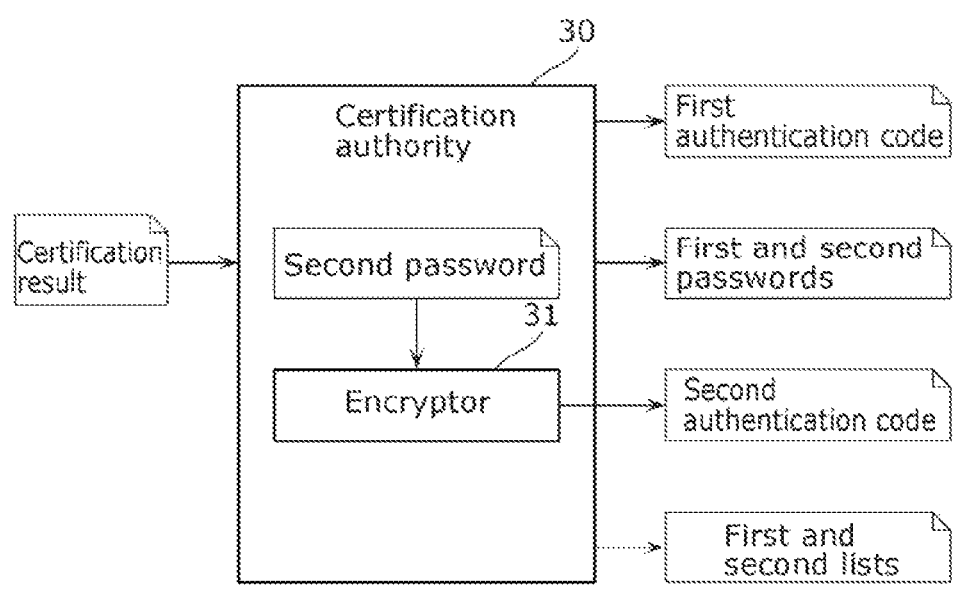
FIG. 14 illustrates another example of data that the certification authority issues to the storage medium.

FIG. 14 illustrates another example of data that the certification authority issues to the storage medium.

When certification authority 30 certifies storage medium 20, certification authority 30 generates the first authentication code corresponding to at least one attribute of storage medium 20, second authentication code, first password, and second password. Certification authority 30 includes an encryptor that generates the second authentication code encrypted using the second password. In this respect, the example shown in FIG. 14 differs from the example shown in FIG. 12.

In recording control system 1 according to the embodiment, control device 10 outputs first request information 600 to storage medium 20 to read at least one common authentication code each corresponding to a respective one of at least one common attribute of first authentication code 310 and first request information 600. According to the at least one common authentication code, control device 10 identifies the at least one common attribute. Thus, control device 10 can read and write data from and to storage medium 20 at performance guaranteed by both control device 10 and storage medium 20.

In recording control system 1 according to the embodiment, the first authentication code includes at least one partial code and an additional code. The at least one partial code each corresponds to a respective one of at least one first attribute. The additional code indicates certification-relevant information relevant to the fact that certification authority 30 has certified that the storage medium 20 has the at least one first attribute corresponding to the at least one partial code. Thus, by reading and analyzing the additional code, control device 10 can verify whether storage medium 20 connected to control device 10 is storage medium 20 certified by certification authority 30.

In recording control system 1 according to the embodiment, storage medium 20 further stores second authentication code 320 showing the legitimacy of the first authentication code. Readout unit 110 reads second authentication code 320 from storage medium 20 by outputting the second request information different from first request information 600 to storage medium 20. Thus, by reading and analyzing second authentication code 320, control device 10 can verify the legitimacy of first authentication code 310 stored in storage medium 20 connected to control device 10.

In recording control system 1 according to the embodiment, second authentication code 320 is encrypted using the second request information as an encryption key. This makes it possible to limit a control device capable of verifying the legitimacy of first authentication code 310 to a particular control device capable of decoding second authentication code 320.

In recording control system 1 according to the embodiment, by referring to first list 400 in which attributes are associated with authentication codes corresponding to the respective attributes, identification unit 120 identifies, as the at least one common attribute, at least one attribute associated with the at least one common authentication code in first list 400. Thus, it is possible to identify the at least one common attribute of control device 10 and storage medium 20 according to the obtained at least one common authentication code.

[Other]

It should be noted that in the embodiment described above, each structural element may be dedicated hardware or be caused to function by running a software program suitable for the structural element. Each structural element may be caused to function by a program running unit, such as a CUP or a processor, reading and running the software program stored in a storage medium, such as a hard disk or semiconductor memory. Here, software used to implement, for example, a program updating method described in the embodiment above is a program as described below.

The program is a recording control method implemented by a recording control system. By running the program, the computer implements the recording control method. The recording control system includes a storage medium and a control device to which the storage medium is to be detachably connected and that controls the reading and writing of data from and to the storage medium. The storage medium stores a first authentication code corresponding to at least one first attribute of the storage medium among attributes regarding reading and writing of storage media in general. The recording control method includes: outputting first request information to the storage medium connected to the control device to read, from the storage medium, at least one common authentication code each corresponding to a respective one of at least one common attribute of the first authentication code and the first request information, the first request information corresponding to at least one second attribute of the control device regarding the reading and writing performed by the control device among the attributes; identifying the at least one common attribute according to the at least one common authentication code; and controlling the reading and writing according to the at least one common attribute.

The embodiment above is provided as exemplification of the technique in the present disclosure. The appended drawings and detailed descriptions are provided to give exemplification.

Thus, the structural elements included in the appended drawings and detailed descriptions include not only structural elements necessary to address the issues but also structural elements not essential to address the issues and provided for exemplification of the technique. Accordingly, even if the non-essential elements are included in the appended drawings and detailed descriptions, the non-essential elements should not be immediately considered essential elements.

The embodiment above is described to give exemplification of the technique in the present disclosure. Accordingly, various alterations, replacement, addition, and omission can be performed in the scope of claims and equivalents.

INDUSTRIAL APPLICABILITY

The present disclosure is useful as, for example, a recording control system capable of performing data reading and writing between a storage medium and control device at guaranteed performance.

The invention claimed is:

1. A recording control system, comprising:
a storage medium; and
a control device to which the storage medium is to be detachably connected and that controls reading and writing of data from and to the storage medium,
wherein the storage medium stores a first authentication code corresponding to a plurality of first attributes of the storage medium among a plurality of attributes indicating performance of reading and writing of storage media in general, and
the control device includes:
a readout unit that outputs first request information to the storage medium connected to the control device to read, from the storage medium, common authentication codes corresponding to a plurality of common attributes, the plurality of common attributes being attributes common to the plurality of first attributes corresponding to the first authentication code and a plurality of second attributes corresponding to the first request information, the first request information corresponding to the plurality of second attributes of the control device regarding the reading and writing performed by the control device among the plurality of attributes, the at least one plurality of common attributes each indicating a rank of a guaranteed performance common to the control device and the storage medium;
an identification unit that identifies performances indicated by the plurality of common attributes according to the at least one common authentication codes read by the readout unit; and
a control unit that controls the reading and writing with one of the performances identified by the identification unit.

2. The recording control system according to claim 1, wherein if the readout unit fails to read the at least one common authentication code, the control unit does not perform the reading and writing on the storage medium.

3. The recording control system according to claim 1, wherein the first authentication code includes at least one partial code and an additional code, the at least one partial code each corresponding to a respective one of the at least one first attribute, and the additional code indicating certification-relevant information relevant to certification of the at least one first attribute corresponding to the at least one partial code by a certification authority.

4. The recording control system according to claim 1,
wherein the storage medium further stores a second authentication code showing legitimacy of the first authentication code, and
the readout unit reads the second authentication code from the storage medium by outputting second request information different from the first request information to the storage medium.

5. The recording control system according to claim 4,
wherein the second authentication code is encrypted using the second request information as an encryption key.

6. The recording control system according to claim 1,
wherein by referring to a list in which the plurality of attributes are associated with a plurality of authentication codes each corresponding to a respective one of the plurality of attributes, the identification unit identifies, as the plurality of common attribute attributes, at least one attribute associated with at least one of the common authentication codes in the list.

7. The recording control system according to claim 1,
wherein the plurality of attributes include at least one of specification versions or performance ranks of the storage media in general.

8. The recording control system according to claim 1,
wherein the one of the performances is highest performance among the performances.

9. A control device to which a storage medium is to be detachably connected and that controls reading and writing of data from and to the storage medium, the control device comprising:
a readout unit that outputs first request information to the storage medium connected to the control device and storing a first authentication code corresponding to a plurality of first attributes of the storage medium among a plurality of attributes indicating performances of reading and writing of storage media in general, to read, from the storage medium, common authentication codes corresponding to a plurality of common attributes, the plurality of common attributes being attributes common to the plurality of first attributes corresponding to the first authentication code and a plurality of second attributes corresponding to the first request information, and the first request information corresponding to the plurality of second attributes of the control device regarding the reading and writing performed by the control device among the plurality of attributes, the plurality of common attributes each indicating a rank of a guaranteed performance common to the control device and the storage medium;
an identification unit that identifies performances indicated by the plurality of common attributes according to the common authentication codes read by the readout unit; and
a control unit that controls the reading and writing with one of the performances identified by the identification unit.

10. The control device according to claim 9,
wherein the one of the performances is highest performance among the performances.

11. A recording control method implemented by a recording control system,
the recording control system including:
a storage medium; and
a control device to which the storage medium is to be detachably connected and that controls reading and writing of data from and to the storage medium,
the storage medium storing a first authentication code corresponding to a plurality of first attributes of the storage medium among a plurality of attributes indicating performances of reading and writing of storage media in general,
the recording control method comprising:
outputting first request information to the storage medium connected to the control device to read, from the storage medium, common authentication codes corresponding to a plurality of common attributes, the plurality of common attributes being attributes common to the plurality of the first attributes corresponding to the first authentication code and a plurality of second attributes corresponding to the first request information, the first request information corresponding to the plurality of second attributes at of the control device regarding the reading and writing performed by the control device among the plurality of attributes, the plurality of common attributes at each indicating a rank of a guaranteed performance common to the control device and the storage medium;
identifying performances indicated by the plurality of common attributes according to the common authentication codes; and
controlling the reading and writing with one of the performances identified in the identifying.

12. The recording control method according to claim 11,
wherein the one of the performances is highest performance among the performances.

13. A storage medium to be detachably connected to a control device that controls reading and writing of data from and to the storage medium,
wherein the storage medium stores a first authentication code corresponding to a plurality of first attributes of the storage medium among a plurality of attributes indicating performances of reading and writing, and
the storage medium outputs, to the control device, common authentication codes corresponding to a plurality of common attributes, the plurality of common attributes being attributes common to the plurality of the first attributes corresponding to of the first authentication code and a plurality of second attributes corresponding to first request information that has been output by the control device and that corresponds to the plurality of second attributes of the control device regarding the reading and writing performed by the control device among the plurality of attributes, the plurality of common attributes each indicating a rank of a guaranteed performance common to the control device and the storage medium, and
the reading and writing of the data are controlled with one of performances indicated by the plurality of common attributes, which is identified according to the at least one common attribution.

* * * * *